E. Parker,
Knob Attachment.
No. 38,406. Patented May 5, 1863.
Fig. 1
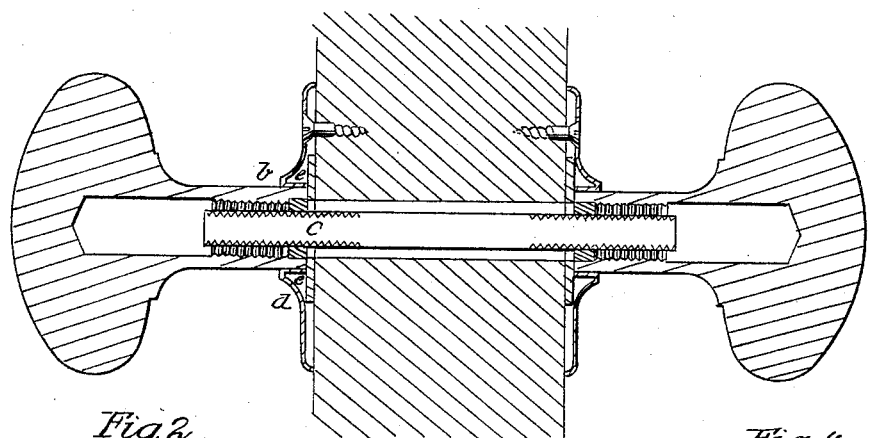
Fig. 2.
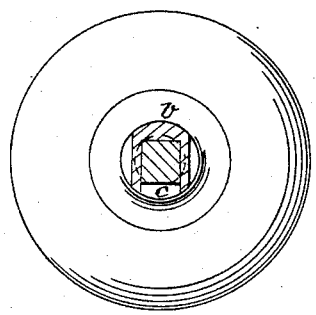
Fig. 3.
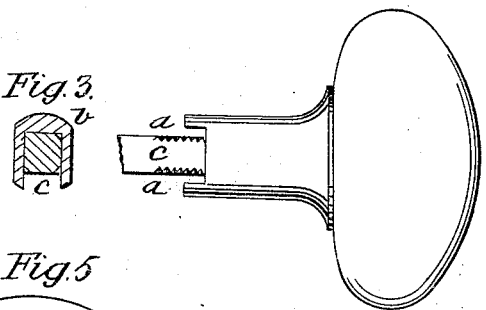
Fig. 4.
Fig. 5
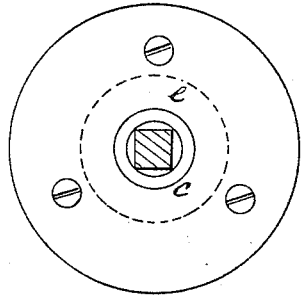
Witnesses
S. H. Maynard
A. C. Thompson
Inventor
Emory Parker
by his Attorney
J. P. Pinson

UNITED STATES PATENT OFFICE.

EMORY PARKER, OF MERIDEN, CONNECTICUT.

IMPROVEMENT IN DOOR-KNOBS.

Specification forming part of Letters Patent No. 38,406, dated May 5, 1863.

*To all whom it may concern:*

Be it known that I, EMORY PARKER, of Meriden, New Haven county, Connecticut, have invented a new and useful Improvement in Door-Knobs; and I do hereby declare that the following is a full, clear, and exact description of the same, reference being made to the annexed drawings, making a part of this specification, in which similar letters indicate similar parts throughout the figures.

My invention is an improvement in that class of door-knobs in which the spindle is adjusted as to length by a greater or less degree of insertion into the knobs in order to suit doors of differing thickness, which adjustment is effected by screwing the spindle in to the desired distance, and then, by some device—usually a screw or pin inserted through the shank of the knob into a groove in the spindle—both are prevented from turning on each other. This screw or pin is apt to work loose, as well as to hurt the hand.

By my improvement the spindle may be adjusted to within one-quarter of the pitch of the thread upon it, and there is also no pin, screw, or other device which can work out or be visible when the knobs are in place, as will be apparent from the following description of the construction.

The spindle is made square, and has the thread cut on the corners only, and the knob is tapped with a female screw, in the usual manner. The face of the shank of the knob is partially cut in, as shown at $a$ in Figure 4, to receive a clamp-piece of metal of the form shown at $b$, Fig. 3, which fills the part cut away on three sides around the spindle, as shown in Fig. 2. When this is in place it is obvious that the knob cannot be turned on the spindle. To secure the piece $b$ in place the escutcheon affixed to the door is made thick enough at that part to cover the piece, as seen at $d$, Fig. 1, the opening in the escutcheon being but just large enough to admit the end of the shank of the knob. If the door is not of hard wood, or if the hole through it is not accurately cut, there should should be a washer-plate, as at $e$, put on before the spindle is inserted.

In operation the escutcheon is first slipped as far back on the shank of the knob as it will go. The knob is then screwed onto the spindle, which projects through the door up to the desired position. The piece $b$ is next put in and the escutcheon is moved to the door, and, being screwed onto that, holds the piece $b$ securely in place, thus inclosing entirely the means by which the knob is prevented from turning on the spindle.

It is not necessary that the piece $b$ shall have the precise form shown, as it will be evident that any form will suffice which will, when held in place by the collar or thick part of the escutcheon, prevent the knob from being turned.

Having thus described my invention, I shall state my claim as follows:

In combination with screw-threaded knob and the screw-threaded angular spindle, the clamp-piece $b$, or its equivalent, fitting a recess in the shank and located with in the escutcheon of the knob, in the manner and for the purpose substantially as set forth.

In testimony whereof I have hereunto subscribed my name.

EMORY PARKER.

Witnesses:
J. P. PIRSSON,
S. H. MAYNARD.